(12) United States Patent
Arakawa

(10) Patent No.: US 8,108,242 B2
(45) Date of Patent: Jan. 31, 2012

(54) WORKING MACHINE FAILURE INFORMATION CENTRALIZED MANAGING SYSTEM

(75) Inventor: Shuji Arakawa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 1218 days.

(21) Appl. No.: 11/883,428

(22) PCT Filed: Feb. 2, 2006

(86) PCT No.: PCT/JP2006/301741
§ 371 (c)(1),
(2), (4) Date: Jul. 31, 2007

(87) PCT Pub. No.: WO2006/085469
PCT Pub. Date: Aug. 17, 2006

(65) Prior Publication Data
US 2008/0140435 A1    Jun. 12, 2008

(30) Foreign Application Priority Data
Feb. 14, 2005 (JP) .................................. 2005-036552

(51) Int. Cl.
*G06F 17/30* (2006.01)
(52) U.S. Cl. ...................................................... 705/7.27
(58) Field of Classification Search ................... 705/7.27
See application file for complete search history.

(56) References Cited

U.S. PATENT DOCUMENTS

| | | | | |
|---|---|---|---|---|
| 6,037,901 A * | 3/2000 | Devier et al. | ............ | 342/357.31 |
| 6,087,945 A * | 7/2000 | Yasuda | ............ | 340/611 |
| 6,728,619 B2 * | 4/2004 | Adachi et al. | ............ | 701/50 |
| 7,222,051 B2 * | 5/2007 | Shibata et al. | ............ | 702/184 |
| 2002/0016655 A1 * | 2/2002 | Joao | ............ | 701/35 |
| 2002/0156558 A1 * | 10/2002 | Hanson et al. | ............ | 701/33 |

FOREIGN PATENT DOCUMENTS

| | | |
|---|---|---|
| EP | 1 213 394 A | 6/2002 |
| JP | 2002-163295 A | 6/2002 |
| JP | A-2002-374583 | 12/2002 |
| JP | A-2003-085315 | 3/2003 |
| JP | A-2003-178148 | 6/2003 |

OTHER PUBLICATIONS

European Search Report dated Oct. 26, 2009 issued from the European Patent Office in corresponding European patent application No. 06712884.3-2316.
Office Action dated Feb. 23, 2010 issued from the Japanese Patent Office in corresponding Japanese patent application No. 2007-502575 (with English translation).

* cited by examiner

*Primary Examiner* — Romain Jeanty
(74) *Attorney, Agent, or Firm* — Posz Law Group, PLC

(57) ABSTRACT

With a system and a method of providing information on a working machine, it is allowed to promptly handle a failure that has not been initially predicted by its designer. Failure occurrence information is transmitted from the working machine 1 side to the communication server 12 (S201). The communication server 12 transfers the failure occurrence information to the maintenance server 14 (S202). The maintenance server 14 additionally records the failure occurrence information to the database. The server 14 computes to obtain predetermined statistical information based on the design failure information, the production failure information, the information related to the treatment examples carried out at the work sites, and the failure occurrence information additionally recorded. The server 14 transmits the obtained statistical information to the communication server 12 (S203). The communication server 12 transmits the statistical information to the working machine 1 (S204). In the working machine 1 side, the statistical information is correlated with the failure occurrence information and recorded in the storage device 111. The statistical information is displayed on the display 142.

4 Claims, 11 Drawing Sheets

FIG. 3

| Reception No. | Reception time | Trouble code | Kind of trouble | Model | Type | Machine No. | Machine No. of communication device | Serial No. of communication device | Time of occurrence | Service meter [H] | Outside air temperature °C | Latitude | Longitude | Altitude [m] |
|---|---|---|---|---|---|---|---|---|---|---|---|---|---|---|
| R0774 | 2002.08.11 13:21 | XZ44FT | Level of cooling water is abnormally low | PC190 | 11 | 40032 | 678 | 572044 | 2002.08.11 13:19 | 2108 | 13.4 | N35.30.29 | E134.09.54 | 17 |
| R0775 | 2002.08.13 08:27 | CV31EX | Arm-angle potentiometer is disconnected | PC340 | 5 | 17893 | 677 | 430098 | 2002.08.13 08:23 | 178 | 22.0 | N36.11.43 | E136.43.01 | 24 |
| R0776 | 2002.08.13 09:55 | BN67EE | Solenoid valve of working machine is not properly operated | WA610 | 7 | 8669 | 678 | 571956 | 2002.08.13 09:54 | 1098 | 16.5 | N35.21.30 | E135.41.09 | 13 |

FIG. 4

| Registration No. | Registration date | Model | Type | Target machine No. | Failure item | Treatment method | Occurrence probability | Trouble code to be caused |
|---|---|---|---|---|---|---|---|---|
| D0017 | 2001.03.21 | PC340 | 5 | ~20000 | Relay connector of potentiometer is pulled out because cable is not long enough for arm angle increase | Change laying route of cable to surely engage connector | Small | CV31EX CV31EY TR44AB |
| D0018 | 2001.12.13 | PC490 | 5 | 10000~15000 | Parameter of control software is defectively set | Replace controller | 100% occurrence | SD78KL |
| D0019 | 2002.05.02 | PC490 | 5 | 20000~ | Operation lever is interfered by additional box (variation) | Remake additional box | Large | None |
| | | | | | | | | |
| | | | | | | | | |

FIG. 5

| Registration No. | Registration date | Model | Type | Target machine No. | Failure item | Treatment method | Occurrence probability | Trouble code to be caused |
|---|---|---|---|---|---|---|---|---|
| M0021 | 2002.02.29 | WA610 | 7 | ~1000 | Delivered part of operation switch is different | Replace with regular product | 100% occurrence | None |
| M0022 | 2002.06.01 | PC190 | 11 | 40000~40100 | Retightening of drain valve of cooling water tank is forgotten | After retightening, refill cooling water | Small | XZ44FT |
| M0023 | 2002.07.10 | PC190 | 11 | 30000~ | Mounting angle of cooling water level switch is inadequate | Re-adjust angle | 100% occurrence | XX67DE XZ44FT |
|  |  |  |  |  |  |  |  |  |

FIG. 6

| Registration No. | Registration date | Model | Type | Machine No. | Failure phenomenon | Treatment example | Trouble code displayed | Accumulated number of occurrences for each failure phenomenon |
|---|---|---|---|---|---|---|---|---|
| T0217 | 2002.06.20 | PC190 | 11 | 39880 | Operation lever of working machine cannot move | Adjust engagement of cover | None | 1 |
| T0218 | 2002.06.26 | PC190 | 11 | 27122 | Connector of cooling water level switch is come off | Surely fit connector | XZ44FT XX67DD | 41 12 |
| T0219 | 2002.06.27 | WA610 | 7 | 6224 | Engine cannot start | Charge battery | CK56EE | 3 |
| T0220 | 2002.06.30 | PC190 | 11 | 25004 | Cooling water is insufficient | Refill cooling water | XZ44FT | 131 |

FIG. 7

| Priority order | Model | Type | Machine No. | Trouble code | Kind of trouble | Occurrence probability | Number of actual cases | Failure item | Treatment method |
|---|---|---|---|---|---|---|---|---|---|
| 1 | PC190 | 11 | 30000~ | XZ44FT | Level of cooling water is abnormally low | 100% occurrence | 35 | Mounting angle of cooling water level switch is inadequate | Re-adjust angle |
| 2 | PC190 | 11 | — | XZ44FT | Level of cooling water is abnormally low | — | 131 | Cooling water is insufficient | Refill cooling water |
| 3 | PC190 | 11 | — | XZ44FT | Level of cooling water is abnormally low | — | 41 | Connector of cooling water level switch is come off | Surely fit connector |
| 4 | PC190 | 11 | 40000~40100 | XZ44FT | Level of cooling water is abnormally low | Small | 2 | Retightening of drain valve of cooling water tank is forgotten | After retightening, refill cooling water |
| | | | | | | | | | |

FIG. 8

| Selection No. | Occurrence probability | Number of actual cases | Possible causes (in order of possibility) | Treatment method |
|---|---|---|---|---|
| 1 | 100% occurrence | 35 | Mounting angle of cooling water level switch is inadequate | Re-adjust angle |
| 2 | — | 131 | Cooling water is insufficient | Refill cooling water |
| 3 | — | 96 | Connector of cooling water level switch is come off | Surely fit connector |
| 4 | Small | 2 | Retightening of drain valve of cooling water tank is forgotten | After retightening, refill cooling water |
| 5 | — | — | Others | |

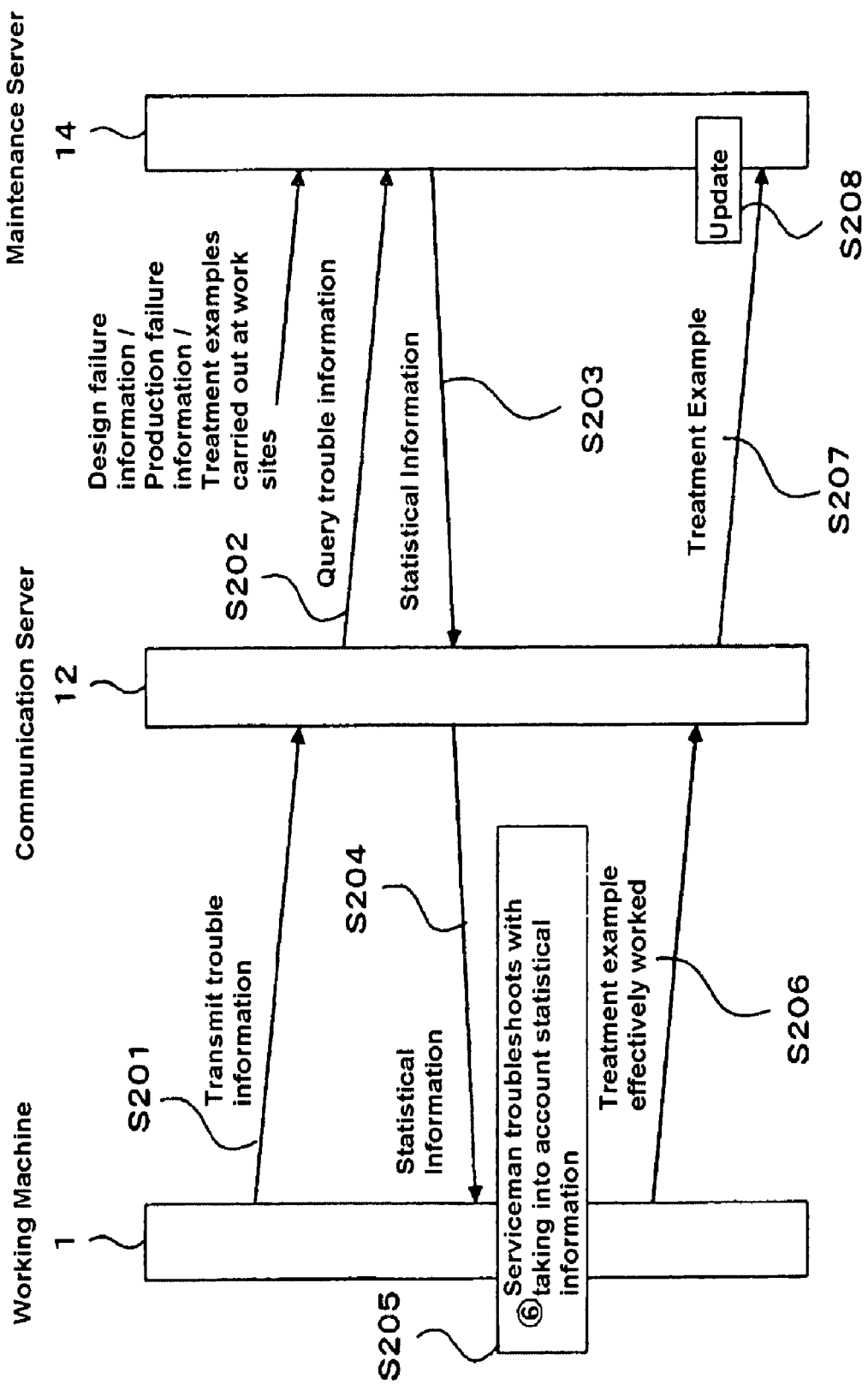

WORKING MACHINE FAILURE INFORMATION CENTRALIZED MANAGING SYSTEM

FIELD OF THE INVENTION

The present invention relates to a system and a method using a computer and a communication network for providing a person involved such as a user and a serviceman with failure management information, which indicates a method or a guide of handling a failure or carrying out maintenance and inspection with regard to a working machine such as a construction machine.

DESCRIPTION OF THE RELATED ART

As an existing system of this kind, the one described in the Patent Document 1 is known. According to this existing system, when a failure such as malfunction and trouble occurs in a working machine, a user operates a user terminal to access a remote server and carries out a maintenance and inspection program corresponding the machine model, which is provided by the server, so that the user can grasp a cause of the failure of the working machine to take action against it.
Patent Document 1: JP-A-2003-178148

BRIEF SUMMARY OF THE INVENTION

Problems that the Invention is to Solve

However, heretofore, information, e.g. a maintenance and inspection program, provided from the server is generally for a trouble which has been predicted by a designer of the working machine before it is sold, therefore normally, such a trouble, ironically, hardly occurs in practice. What is actually problematic is the case where a failure that has not been predicted by the designer occurs. In the related art, when such a failure occurs, it is difficult to handle the failure quickly and appropriately, and it is also difficult to usually carry out effective maintenance and inspection for preventing such a failure from occurring.

Accordingly, an object of the present invention is to, with a system and a method of providing information on a working machine, promptly handle a failure that has not been initially predicted by its designer.

Means for Solving the Problems

A working machine (1) according to a first aspect of the present invention includes: a condition detecting means (150, 160) for detecting conditions of respective parts of which the working machine (1) consists; a failure information generating means (100) for collecting information related to the conditions of respective parts which is detected by the condition detecting means (150, 160) to check whether or not a failure occurs in the respective parts referring to the collected information, and when the failure occurrence is distinguished, generating predetermined failure information to output it; an information transmitting/receiving means (110, 130) for wirelessly transmitting the failure information output from the failure information generating means (100) as well as receiving treatment information related to the failure information wirelessly transmitted to output it; and an informing means (142) for serving to inform an operator of the failure information output from the failure information generating means (100) or the treatment information output from the information transmitting/receiving means (110, 130).

A centralized information management device (10) of the working machine (1) according to a second aspect of the present invention includes: a storing means (14) for separately storing failure management information including at least information that indicates a method of handling a failure which is expected to occur, depending on each individual working machine (1) which is under the management of the device (10); an information processing means (14) for receiving information related to each individual working machine (1), which includes at least the predetermined failure information that indicates failure occurrence, wirelessly transmitted from the information transmitting/receiving means (110, 130) arranged in each individual working machine (1) under the management of the device (10), to perform a predetermined processing on the information; a failure management information revising means (14) for performing an update processing or an additional processing of new information on the failure management information stored in the storing means (14), based on a processing result by the information processing means (14); and a transmitting means (12) for transmitting the failure management information or the revised failure management information in response to a request from the information transmitting/receiving means (110, 130) arranged in each individual working machine (1) or from a portable terminal carried by an operator.

A failure management information providing system of a working machine according to a third aspect of the present invention includes a working machine (1) and a centralized information management device (10) which puts the working machine (1) under its management. The working machine (1) has: a condition detecting means (150, 160) for detecting conditions of respective parts of which the working machine (1) consists; a failure information generating means (100) for collecting information related to the conditions of respective parts which is detected by the condition detecting means (150, 160) to check whether or not a failure occurs in the respective parts referring to the collected information, and when the failure occurrence is distinguished, generating predetermined failure information to output it; an information transmitting/receiving means (110, 130) for wirelessly transmitting the failure information output from the failure information generating means (100) as well as receiving treatment information related to the failure information wirelessly transmitted to output it; and an informing means (142) for serving to inform an operator of the failure information output from the failure information generating means (100) or the treatment information output from the information transmitting/receiving means (110, 130). The centralized information management device (10) has: a storing means (14) for separately storing failure management information including at least information that indicates a method of handling a failure which is expected to occur, depending on each individual working machine (1) which is under the management of the device (10); an information processing means (14) for receiving information related to each individual working machine (1), which includes at least the predetermined failure information that indicates failure occurrence, wirelessly transmitted from the information transmitting/receiving means (110, 130) arranged in each individual working machine (1) under the management of the device (10), to perform a predetermined processing on the information; a failure management information revising means (14) for performing an update processing or an additional processing of new information on the failure management information stored in the storing means (14), based on a processing result by the information processing means (14); and a transmitting means (12) for transmitting the failure management information or the revised failure management information in response to a request from the information transmitting/receiving means (110, 130) arranged in each individual working machine (1) or from a portable terminal carried by an operator.

A failure management information providing method of a working machine (1) according to a fourth aspect of the present invention includes a working machine (1) and a centralized information management device (10) which puts the working machine (1) under its management. The working machine (1) has the steps of: detecting conditions of respective parts of which the working machine (1) consists; collecting information related to the conditions of respective parts which is detected by the step of detecting the conditions to check whether or not a failure occurs in the respective parts referring to the collected information, and when the failure occurrence is distinguished, generating predetermined failure information to output it; wirelessly transmitting the failure information generated in the step of generating and outputting the failure information as well as receiving treatment information related to the failure information wirelessly transmitted to output it; and serving to inform an operator of the failure information generated in the step of generating and outputting the failure information or the treatment information received in the step of receiving and outputting the treatment information. The centralized information management device (10) has the steps of: separately storing failure management information including at least information that indicates a method of handling a failure which is expected to occur, depending on each individual working machine (1) which is under the management of the device (10); receiving information related to each individual working machine (1), which includes at least the predetermined failure information that indicates failure occurrence, wirelessly transmitted from the information transmitting/receiving means (110, 130) arranged in each individual working machine (1) under the management of the device (10), to perform a predetermined processing on the information; performing an update processing or an additional processing of new information on the failure management information stored in the step of storing, based on a processing result in the step of performing the predetermined processing; and transmitting the failure management information or the revised failure management information in response to a request from the information transmitting/receiving means (110, 130) arranged in each individual working machine (1) or from a portable terminal carried by an operator.

A centralized information management method of a working machine according to a fifth aspect of the present invention includes the steps of: separately storing failure management information including at least information that indicates a method of handling a failure which is expected to occur, depending on each individual working machine (1) which is under the management of the device (10); receiving information related to each individual working machine (1), which includes at least the predetermined failure information that indicates failure occurrence, wirelessly transmitted from the information transmitting/receiving means (110, 130) arranged in each individual working machine (1) under the management of the device (10), to perform a predetermined processing on the information; performing an update processing or an additional processing of new information on the failure management information stored in the step of storing, based on a processing result in the step of performing the predetermined processing; and transmitting the failure management information or the revised failure management information in response to a request from the information transmitting/receiving means (110, 130) arranged in each individual working machine (1) or from a portable terminal carried by an operator.

Effect of the Invention

According to the present invention, with a system and a method of providing information on a working machine it is allowed to promptly handle a failure that has not been initially predicted by its designer.

BRIEF DESCRIPTION OF THE DRAWINGS

FIG. 3 shows an example of the failure-handling result information table held by the working machine shown in FIGS. 1 and 2.

FIG. 4 shows an example of the design failure information table of the working machine held by a job server.

FIG. 5 shows an example of the production failure information table of the working machine held by the job server.

FIG. 6 shows an example of the manually-input trouble treatment information table of the working machine held by the job server.

FIG. 7 shows an example of the failure management information table of the working machine held by the management server.

FIG. 8 shows an example of the latest failure management information table displayed on the display of the UI device.

FIG. 9 shows a processing flow in receiving and transmitting information between the working machine and the management server, in the information providing system of the working machine according to an embodiment of the present invention.

1: Working Machine
6: Satellite Earth Station
7: Communication Network
8: Communication Satellite
9: GPS Satellites
10: Management Server
12: Communication Server
14: Maintenance Server
20: User Terminal
30: Service Terminal
100: Electronic Controller
110: Communication Controller
111: Storage Device
120: GPS (Global Positioning System)
121: GPS Antenna
130: Satellite Communication Terminal
131: Satellite Communication Antenna 140: User Interface (UI) Device
142: Display
144: Input Device
150: Sensors
160: Service Meter
170: In-vehicle Network

DETAILED DESCRIPTION OF THE INVENTION

In what follows, a system for providing information on a working machine according to an embodiment of the present invention will be explained with reference to the drawings.

Figure 1:
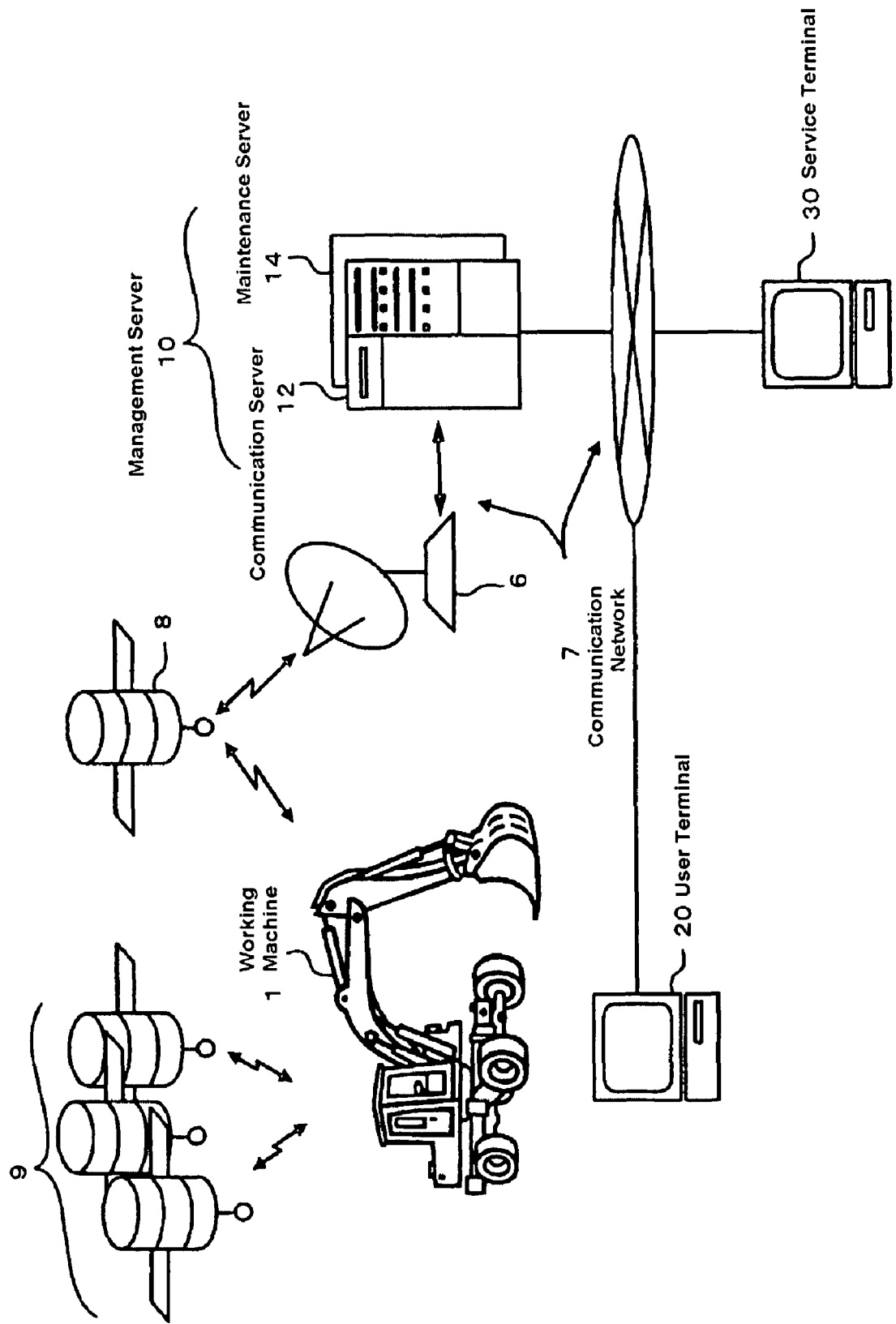
FIG. 1 is a block diagram showing the entire structure of an information providing system of a working machine according to an embodiment of the present invention.

FIG. 1 shows the entire structure of the system.

As shown in FIG. 1, this information providing system includes: a working machine 1; a management server 10 for managing information on the working machine 1; a user terminal 20 which is used by a user of the working machine 1; a service terminal 30 which is used by a serviceman who carries out maintenance and inspection; and a communication network 7 which connects them so that they can communicate each other.

Herein, the communication network 7 includes: a satellite radio communication network which connects between the working machine 1 and a satellite earth station 6 via a communication satellite 8; a dedicated ground communication network which connects between the satellite earth station 6 and the management server 10; and a computer communication network, such as an intranet or the Internet, which connects between the management server 10 and the user terminal 20 or the service terminal 30. Incidentally, numeral 9 denotes a plurality of GPS satellites.

A satellite communication channel is used for a purpose of allowing the working machine 1 to communicate with the management server 10 wherever the working machine 1 is located. As long as the same purpose is achieved, instead of the satellite communication channel, any other kind of mobile communication network or radio communication network may also be used.

Although there is illustrated only a single machine for each of the working machine 1, the user terminal 20 and the service terminal 30, in practice, there are many for each of them usually. Those working machines 1 can include, for example, construction machinery such as a hydraulic shovel, a wheel loader, a bulldozer, a motor grader, and a crane, a delivery vehicle such as a dump truck, and industrial machinery such as various types of crushing and power generating machines. As the user terminal 20 and the service terminal 30, for example, a personal computer and a workstation or a hand-held terminal (including a mobile phone) can be used. Each of terminals 20, is capable of running an application program for bi-directionally communicating with the management server 10.

Each working machine 1 can also bi-directionally communicate with the management server 10 via a satellite communication channel. Each working machine 1 has a function that detects and collects operation information which indicates current operation conditions (integrated operation time (service meter value), engine speed, battery voltage, fuel quantity, engine coolant water temperature, etc.) continuously within the machine, then to transmit the collected operation information substantially in real time (e.g. at several hour intervals, or 24-hour intervals) to the management server 10. In addition, each working machine 1 has a function that, when any malfunction or trouble (herein, referred to as "failure") occurs within the working machine 1, detects the failure to generate detail information on the detected failure (e.g. type of the failure, concrete state, etc.) (herein, referred to as "failure occurrence information"), then transmits the failure occurrence information substantially in real time (for example, at the time when the failure is detected, or at the time when the operation information is transmitted, together with the operation information) to the management server 10.

Furthermore, each working machine 1 has a function that, in response to a serviceman's or a user's request, from the management server 10, receives failure-handling guidance information, which indicates or guides a method or a guide of dealing with a failure, such as cause investigation on the occurred failure and repair and part replacement for eliminating the failure, and maintenance and inspection guidance information, which indicates or guides a method or a guide of usual maintenance and inspection for preventing the failure from occurring (herein, the failure-handling guidance information and the maintenance and inspection guidance information is generally referred to as "failure management information"), then to display it on a display. Still further, each working machine 1 has a function that, in the case where the failure handling such as repair or part replacement is performed on the occurred failure, allows a serviceman or a user to input information on the details (herein, the information is referred to as "failure-handling result information") of the failure handling (which part is how repaired or replaced etc.) and on the result thereof (whether the failure is eliminated or not), then to transmit the failure-handling result information to the management server 10.

The management server 10 may be consisted of a single computer machine or a plurality of computer machines. In any case, the management server 10 has a communication server 12 for controlling communication with the working machine 1, the user terminal 20 and the service terminal 30, and a maintenance server 14 which serves to create and manage the failure management information for the working machine 1.

The maintenance server 14 in the management server 10 has a database, in which, for each model of working machine 1, stores the abovementioned failure management information which indicates or guides a method or a guide of handling the failure and of conducting the maintenance and inspection. Further, the maintenance server 14 receives the aforementioned operation information, the failure occurrence information and the failure-handling result information transmitted from respective multiple working machines 1 substantially in real time as described above, then to analyze and statistically process these pieces of information promptly. For example, the failure occurrence information is classified by respective machine models to statistically process it, so that for the respective machine models, a kind of failure occurred, degree of occurrence probability of each failure, etc. are determined. In the case where a new unpredicted failure occurs, it can also be grasped. In addition, the failure occurrence information is associated with the operation information to be analyzed, so that for respective failures, a condition related with the operation information (operation conditions) where the failure tends to occur, or operation conditions where the failure tends not to occur, and a viewpoint of maintenance and inspection for preventing the failure from occurring are determined. Further, the failure occurrence information is analyzed with associating it with the failure-handling result information, so that for respective failures, an effective handling method and a maintenance and inspection method are determined. Based on a result of such a statistic processing and an analysis, the maintenance server 14 updates the contents of the failure management information (the failure-handling guidance information and the maintenance and inspection guidance information) on the known failures stored in the database to the more appropriate or accurate ones. Then an unknown new failure is discovered, the failure management information for that new failure is newly created to be registered in the database. Based on the aforementioned information transmitted substantially in real time from multiple working machines 1 located in a country or the world, the failure management information (the failure guidance information and the maintenance and inspection guidance information) is updated continuously. Therefore, the contents of the failure management information are always improved and correspond to the latest actual situations. Furthermore, the maintenance server 14 has a function that, in response to a request from each working machine 1, transmits the failure management information on the requested failure, especially the latest failure management information corresponding to the model of the working machine 1 to the working machine 1. The maintenance server 14 can transmit the latest failure management information not only to the working machine 1 but also, in response to a request from the service terminal 30, to the user terminal 20 and the service terminal 30.

Figure 2:
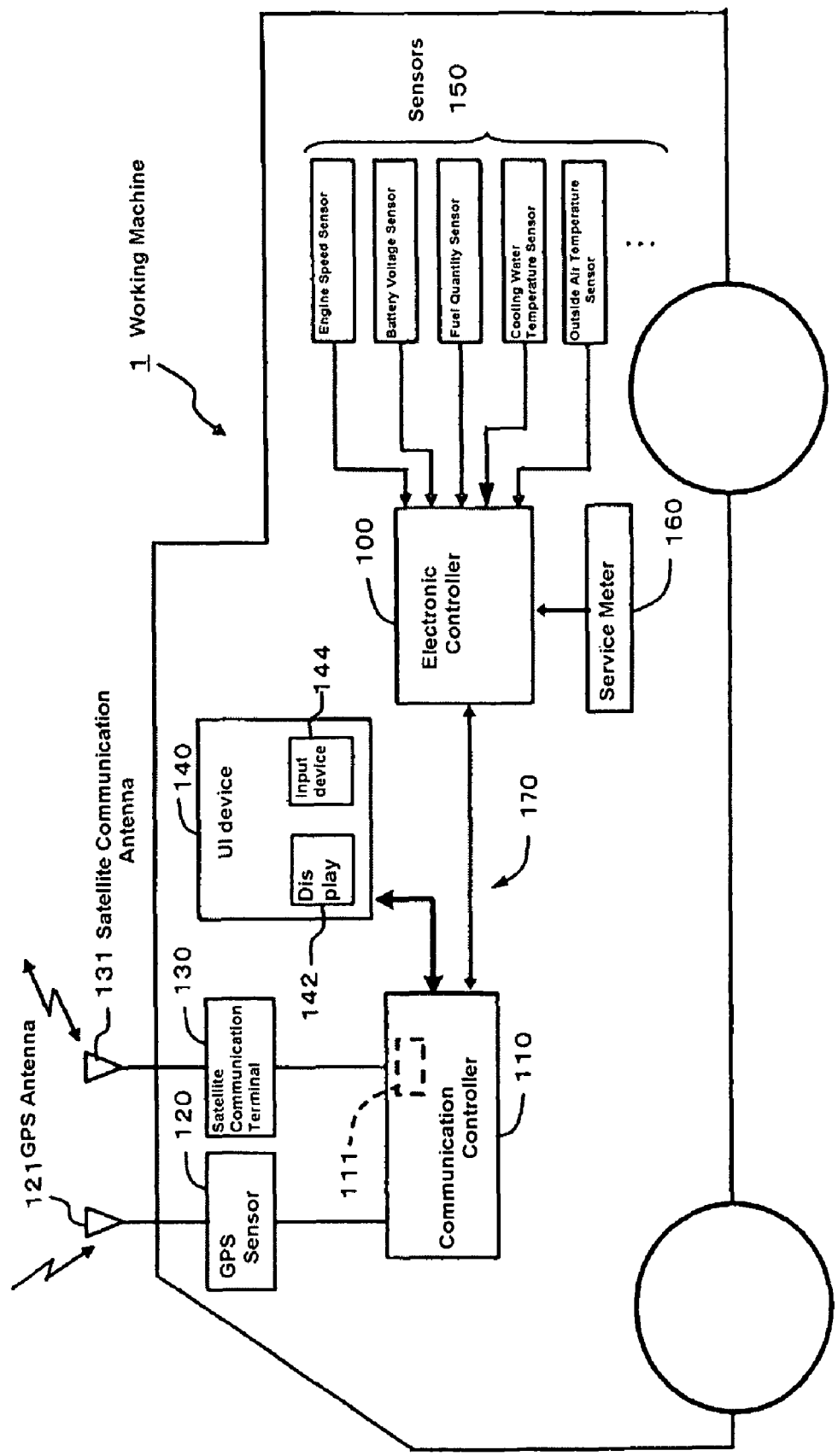
FIG. 2 is a block diagram showing a configuration of the section related to communication of the working machine according to the embodiment.

FIG. 2 is a block diagram showing a configuration of the working machine 1, especially a section which is related to communication with the management server 10.

The working machine 1 has an electronic controller 100, a communication controller 110, a global positioning system (GPS) sensor 120, a satellite communication terminal 130, and a user interface (UI) device 140. All or some of them are so connected that they can mutually communicate via a single or a plurality of in-vehicle networks. Alternatively, for example, the electronic controller 100 and the communication controller 110 may be combined as one, or the UI device 140 and the electronic controller 100 may be combined as one, in order to integrate a plurality of functions or circuits into one.

The electronic controller 100 has a function that continuously collects various operation information and failure occurrence information on the working machine 1 in real time. The electronic controller 100 is connected with various sensors 150 which are mounted on various parts or units of the working machine 1 (e.g. engine, battery, fuel tank, radiator, hydraulic circuit, and electrical or electronic circuit, etc.). These sensors serve for detecting conditions of their corresponding parts and units or conditions of their environment. The sensors include, for example, an engine speed sensor, a battery voltage sensor, a fuel quantity sensor, a cooling water temperature sensor, an outside air temperature sensor, and other kinds of sensors. Also, a service meter 160, which measures an operation time (a time during which the engine rotates) of the working machine 1 and adds them up to output the integrated operation time, is connected to the electronic controller 100.

The electronic controller 100 continuously receives various detection signals which are output from the abovementioned various sensors 150 and the service meter 160, to generate the operation information which indicates the integrated operation time, the engine speed, the battery voltage, the fuel quantity, the cooling water temperature, the outside air temperature, and other current operation conditions. The electronic controller 100 always analyzes the aforementioned detection signal to determine whether or not a failure occurs. When it is determined that a failure occurs, the electronic controller 100 generates the failure occurrence information including the trouble code which indicates the type of failure, a message which indicates the concrete conditions of the failure, etc. Then, the electronic controller 100 transmits the aforementioned operation information and failure occurrence information, both of which have been generated, to the communication controller 110.

The GPS sensor 120 has a GPS antenna 121 for receiving the electric waves from the GPS satellites 9 (FIG. 1). The GPS sensor 120 measures a current position (latitude, longitude and altitude) of the working machine 1 to report it to the communication controller 110. The satellite communication terminal 130 has a satellite communication antenna 131 for communicating with the communication satellite 8 (FIG. 1). The satellite communication terminal 130 allows communication between the communication controller 110 and the management server 10 via a satellite communication network.

The user interface (UI) device 140 serves for conveying information between a person and the working machine 1 and is installed within the operator's cabinet of the working machine 1. The UI device 140 has a display 142 such as a liquid crystal display panel and an input device 144 such as a keyboard or a pointing device.

The communication controller 110 controls the communication between the working machine 1 and the management server 10. The communication controller 110 has a rewritable nonvolatile storage device 111, which stores the attribute information of the working machine 1 (e.g. the model and the type of the working machine 1, and the machine number (which is the identification number unique to the working machine 1) and the product number and the serial number of the communication device of the on-board satellite communication terminal 130).

The communication controller 110 receives the abovementioned operation information and failure occurrence information from the electronic controller 100. Also, the communication controller 110 receives the position information indicating the current position (latitude, longitude and altitude) from the GPS sensor 120. Then, the communication controller 110 transmits the aforementioned operation information, the failure information and the aforementioned position information through the satellite communication terminal 130 to the management server 10. Together with these pieces of information, the attribute information of the working machine 1 stored in the storage device 111 is transmitted. In order to report the aforementioned operation information, the failure occurrence information and the aforementioned position information substantially in real time to the management server 10, the communication controller 110 transmits these pieces of information periodically in a cycle of which length cannot be deemed as excessive delay in light of failure management. For example, during hours normally when work operation is not under way, once a day, the aforementioned transmission of the information is carried out. Alternatively, the aforementioned transmission may be carried out in a few hours period. Or, as well as such a periodic transmission, transmission may be irregularly made on an as-needed basis, for example, instantaneously made at a time when a failure is detected, or instantaneously made at a time when the management server 10 requests. The aforementioned information transmitted to the management server 10, as already explained, is utilized for updating the failure management information (the failure-handling guidance information and the maintenance and inspection guidance information) in the management server 10.

The communication controller 110 also has a function that receives the latest failure management information corresponding to the model of the working machine 1 and transmits it to the UI device 140 to display it on the display 142. In the case where a failure occurs in the working machine 1 or where a serviceman or a user intends to carry out the maintenance and inspection, they can utilize this function to receive the latest failure management information from the management server 10 and display it on the display 142. This facilitates that they can handle the failure and carry out the maintenance and inspection quickly and appropriately.

After handling the failure in the working machine 1, a serviceman or a user can operate the input device 144 of the UI device 140 to input the failure-handling information indicating details and the result of the failure handling performed. The communication controller 110 receives the input failure-handling information from the UI device 140, then to transmit the failure-handling information to the management server 10 substantially in real time (for example, instantaneously, or at the same time when the operation information is transmitted). The failure-handling result information transmitted to the management server 10, as already explained, is utilized for updating the failure management information (the failure-handling guidance information and the management and inspection guidance information) in the management server 10.

FIG. 3 shows an example of the table in which the failure-handling result information is registered and which is held by the working machine 1, for example, shown in FIGS. 1 and 2 (hereinafter called "failure-handling result information table").

The failure-handling result information table is stored in the (rewritable and nonvolatile) storage device 111 which is built in the communication controller 110 shown in FIG. 2. The information on the respective items registered in the failure-handling result information table is transmitted from the working machine 1 side to the management server 10 side via the communication satellite 8 and the satellite earth station 6. The failure-handling result information table includes items, as shown in FIG. 3: reception number; reception time; trouble code; kind of trouble; model; type; machine number; product number of the communication device; serial number of the communication device; time of occurrence, service meter (H); outside air temperature (degrees centigrade); latitude; longitude; and altitude (m). The respective items of reception time; trouble code; kind of trouble; model; type; machine number; product number of the communication device; serial number of the communication device; time of occurrence, service meter (H); outside air temperature (degrees centigrade); latitude; longitude; and altitude (m) are so set that all of them are associated with each reception number, and are correlated with one another. Incidentally, the aforementioned failure-handling result information table can be contained in the management server 10 side.

The reception numbers are serially numbered (e.g. R0774, R0775, R0776, and so on) and registered. As the reception time, date and time (e.g. 2002-08-11 13:21 for reception No. R0774, 2002-08-13 08:27 for reception No. R0775, 2002-08-13 09:55 for reception No. R0776, and so on) are respectively registered. Next, as the trouble code, for example, XZ44FT for reception time 2002-08-11 13:21, CV31EX for reception time 2002-08-13 08:27, and BN67EE for reception time 2002-08-13 09:55, that is, 6-digit alphanumeric characters are respectively registered.

Next, as the kind of trouble, events, for example "Level of cooling water is abnormally low" for trouble code XZ44FT, "Arm-angle potentiometer is disconnected" for trouble code CV31EX, and "Solenoid valve of working machine is not properly operated" for trouble code BN67EE, are respectively registered. That is, the respective kinds of trouble are correspondingly related to the respective trouble codes. Next, as the model, for example, PC190 for trouble code XZ44FT, PC340 for trouble code CV31EX, and WA610 for trouble code BN67EE are respectively registered. Next, as the type, for example, 11 for model PC190, 5 for model PC340, and 7 for model WA610 are respectively registered. Next, as the machine numbers, for example, No. 40032 for model PC190, No. 17893 for model PC340, and No. 8669 for model WA610 are respectively registered.

Next, as the product number of communication device, for example, No. 678 both for machine number 40032 and 8669, and No. 677 for machine number 17893 are respectively registered. Next, as the serial number of communication device, for example, No. 572044 for machine number 40032, No. 430098 for machine number 17893, and No. 571956 for machine number 8669 are respectively registered. Next, as the time of (trouble) occurrence, for example, 2002-08-11 13:19 for trouble code XZ44FT, 2002-08-13 08:23 for trouble code CV31EX, and 2002-08-13 09:54 for trouble code BN67EE are respectively registered. Next, as the service meter (H), for example, 2108 for time of occurrence 2002-08-11 13:19, 178 for time of occurrence 2002-08-13 08:23, and 1098 for time of occurrence 2002-08-13 09:54 are respectively registered. Next, as the outside air temperature (degrees centigrade), 13.4 for service meter (H) 2108, 22.0 for service meter (H) 178, and 16.5 for service meter (H) 1098 are respectively registered.

Next, as the latitude, for example, N35.30.29 for outside air temperature 13.4, N36.11.43 for outside air temperature 22.0, and N35.21.30 for outside air temperature 16.5 are respectively registered. Next, as the longitude, for example, E134.09.54 for latitude N35.30.29, E136.43.01 for latitude N36.11.43, and E135.41.09 for latitude N35.21.30 are respectively registered. Additionally, as the altitude (m), for example, 17 for longitude E134.09.54, 24 for longitude E136.43.01, and 13 for longitude E135.41.09 are respectively registered.

FIG. 4 shows an example of the table in which the design failure information on the working machine 1 is registered and which is held by, for example, a server (not shown) installed for managing the development and production process of the working machine 1 (hereinafter, referred to as "design failure information table"). In the following explanation, the aforementioned server (not shown) is referred to as a job server, since it should be distinguished from the management server 10 shown in FIGS. 1 and 2 (which is used for a system for remotely managing the working machine 1).

In the design failure information table shown in FIG. 4, when a failure related to the design of the working machine 1, such as an error in writing the size designation, an error in the design calculation, and use of out-of-specifications, is discovered in, for example, the development and production process of the working machine 1, the information related to the failure as well as the code of a trouble possibly resulted from the failure are registered. The design failure information table includes items, as shown in FIG. 4, registration number, registration date, model, type, target machine number, failure item, treatment method, occurrence probability, and trouble code to be caused. The respective items of registration date, model, type, target machine number, failure item, treatment method, occurrence probability, and trouble code to be caused are so set that all of them are associated with each registration number, and are correlated with one another.

The registration number are serially numbered (e.g. D0017, D0018, D0019, and so on) and registered. As the registration date, date (e.g. 2001-03-21 for registration No. D0017, 2001-12-13 for registration No. D0018, 2002-05-02 for registration No. D0019, and so on) are respectively registered. Next, as the model, for example, PC340 for registration date 2001-03-21, PC490 for registration date 2001-12-13, and PC490 for registration date 2002-05-02, that is, 5-digit alphanumeric characters are respectively registered. Next, as the type, for example, 5 all for registration date 2001-03-21 and model PC340, registration date 2001-12-13 and model PC490, and registration date 2002-05-02 and model PC490 are respectively registered. As the target machine number, for example, up to 20000 for registration date 2001-03-21 and model PC340, 10000 to 15000 for registration date 2001-12-13 and model PC490, 20000 and larger for registration date 2002-05-02 and model PC490 are respectively registered.

Next, as the failure item, events, for example "Relay connector of potentiometer is pulled out because cable is not long enough for arm angle increase" for registration date 2001-03-21 and model PC340, "Parameter of control software is defectively set" for registration date 2001-12-13 and model PC490, and "Operation lever is interfered by additional box (variation)" for registration date 2002-05-02 and model PC490, are respectively registered. Next, as the treatment method, events, for example, "Change laying route of cable to surely engage connector" for the failure item of registration date 2001-03-21 and model PC340, "Replace controller" for the failure item of registration date 2001-12-13 and model PC490, and "Remake additional box" for the failure item of registration date 2002-05-02 and model PC490 are respectively registered.

Next, as the occurrence probability, for example, small for the failure item of registration date 2001-03-21 and model PC340, 100% occurrence for the failure item of registration date 2001-12-13 and model PC490, and large for the failure item of registration date 2002-05-02 and model PC490 are respectively registered. Furthermore, as the trouble code to be caused, for example, CV31EX, CV31EY, and TR44AB for the failure item of registration date 2001-03-21 and model PC340, SD78KL for the failure item of registration date 2001-12-13 and model PC490, that is, 6-digit alphanumeric characters are respectively registered. Incidentally, in this example, for the failure item of registration date 2002-05-02 and model PC490, no trouble code to be caused is registered.

FIG. 5 shows an example of the table in which the production failure information on the working machine 1 is registered and which is held by the abovementioned job server (not shown) (hereinafter referred to as "production failure information table").

In the production failure information table shown in FIG. 5, when a failure related to the production of the working machine 1, such as an error in a delivered part, a work omission, and insufficient installation and adjustment, is discovered in, for example, the development and production process of the working machine 1, the information related to the failure as well as the code of a trouble possibly resulted from the failure are registered. The production failure information table includes items, as shown in FIG. 5, registration number, registration date, model, type, target machine number, failure item, treatment method, occurrence probability, and trouble code to be caused. The respective items of registration date, model, type, target machine number, failure item, treatment method, occurrence probability, and trouble code to be caused are so set that all of them are associated with each registration number, and are correlated with one another, as is in the design failure information table shown in FIG. 4.

The registration number are serially numbered (e.g. M0021, M0022, M0023, and so on) and registered. As the registration date, dates (e.g. 2002-02-29 for registration No. M0021, 2002-06-01 for registration No. M0022, 2002-07-10 for registration No. M0023, and so on) are respectively registered. Next, as the model, for example, WA610 for registration date 2002-02-29, PC190 for registration date 2002-06-01, and PC190 for registration date 2002-07-10, that is, 5-digit alphanumeric characters are respectively registered.

Next, as the type, for example, 7 for registration date 2002-02-29 and model WA610, 11 both for registration date 2002-06-01 and model PC190 and registration date 2002-07-10 and model PC190 are respectively registered. Next, as the target machine number, for example, up to 1000 for registration date 2002-02-29 and model WA610, 40000 to 40100 for registration date 2002-06-01 and model PC190, 30000 and larger for registration date 2002-07-10 and model PC190 are respectively registered. Next, as the failure item, events, for example "Delivered part of operation switch is different" for registration date 2002-02-29 and model WA610, "Retightening of drain valve of cooling water tank is forgotten" for registration date 2002-06-01 and model PC190, and "Mounting angle of cooling water level switch is inadequate" for registration date 2002-07-10 and model PC190, are respectively registered. Next, as the treatment method, events, for example, "Replace with regular product" for the failure item of registration date 2002-02-29 and model WA610, "After retightening, refill cooling water" for the failure item of registration date 2002-06-01 and model PC190, and "Re-adjust angle" for the failure item of registration date 2002-07-10 and model PC190 are respectively registered.

Next, as the occurrence probability, for example, 100% occurrence for the failure item of registration date 2002-02-29 and model WA610, small for the failure item of registration date 2002-06-01 and model PC190, and 100% occurrence for the failure item of registration date 2002-07-10 and model PC190 are respectively registered. Furthermore, as the trouble code to be caused, for example, XZ44FT for the failure item of registration date 2002-06-01 and model PC190, XX67DE and XZ44FT for the failure item of registration date 2002-07-10 and model PC190, that is, 6-digit alphanumeric characters are respectively registered. Incidentally, in this example, for the failure item of registration date 2002-02-29 and model WA610, no trouble code to be caused is registered.

FIG. 6 shows an example of the table in which the trouble treatment information related to the working machine 1 is manually input at a (work) site and which is held (managed) by the abovementioned job server (not shown) (hereinafter referred to as "manually-input trouble treatment information table").

For example, when any trouble occurs in the working machine 1 and a serviceman has finished the treatment to the trouble, the serviceman selects which treatment he/she actually selected to repair the trouble among the treatment examples displayed on the display 142 (of the UI device 140) shown in FIG. 2. Thus, the information related to the selected treatment example is automatically transmitted from the working machine 1 (shown in FIGS. 1 and 2) to the management server 10 (shown in FIG. 1) side. The aforementioned information related to the treatment example displayed on the display 142 is information which is transmitted from the management server 10 side.

However, options for all treatment examples are not preliminarily registered in the information on the treatment examples transmitted to the working machine 1 from the management server 10 side. Therefore, as the number of treatment examples increases, registration of the treatment examples must be enhanced.

In the case where a corresponding failure cause or a corresponding treatment example is not registered in the latest failure management information table displayed on the display 142, the serviceman operates the input device 144 to input the option No. 5 (possible cause=others) in the latest failure management information table shown in FIG. 8 to the UI device 140. After coming back from the work site, the serviceman inputs the contents of the treatment carried out at the site into the maintenance server 14, so that a new treatment example is registered in the latest failure management table.

The manually-input trouble treatment information table includes items, as shown in FIG. 6, registration number, registration date, model, type, target machine number, failure item, treatment example, trouble code displayed (on the display), and accumulated number of occurrences for each failure phenomenon. The respective items of registration date, model, type, target machine number, failure phenomenon, treatment example, trouble code displayed (on the display), and accumulated number of occurrences for each failure phenomenon are so set that all of them are associated with each registration number, and are correlated with one another, as is in the production failure information table shown in FIG. 5.

The registration number are serially numbered (e.g. T0217, T0218, T0219, T0220, and so on) and registered. As the registration date, dates (e.g. 2002-06-20 for registration No. T0217, 2002-06-26 for registration No. T0218, 2002-06-27 for registration No. T0219, 2002-06-30 for registration No. T0220, and so on) are respectively registered. Next, as the model, for example, PC190 all for registration date 2002-06-20, registration date 2002-06-26 and registration date 2002-06-30, WA610 for registration date 2002-06-27, that is, 5-digit alphanumeric characters are respectively registered.

Next, as the type, for example, 7 for registration date 2002-06-27 and model WA610, 11 for the other registration dates 2002-06-20, 2002-06-26, 2002-06-30 and model PC190 are respectively registered. Next, as the target machine number, for example, No. 39880 for registration date 2002-06-20 and model PC190, No. 27122 for registration date 2002-06-26 and model PC190, No. 6224 for registration date 2002-06-27 and model WA610, and No. 25004 for registration date 2002-06-30 and model PC190 are respectively registered. Next, as the failure phenomenon, events, for example "Operation lever of working machine cannot move" for registration date 2002-06-20 and model PC190, "Connector of cooling water level switch is come off" for registration date 2002-06-26 and model PC190, "Engine cannot start" for registration date 2002-06-27 and model WA610, and "Cooling water is insufficient" for registration date 2002-06-30 and model PC190 are respectively registered.

Next, as the treatment example, events, for example, "Adjust engagement of cover" for the failure phenomenon of registration date 2002-06-20 and model PC190, "Surely fit connector" for the failure phenomenon of registration date 2002-06-26 and model PC190, "Charge battery" for the failure phenomenon of registration date 2002-06-27 and model WA610, and "Refill cooling water" for the failure phenomenon of registration date 2002-06-30 and model PC190 are respectively registered.

Next, as the trouble code displayed, for example, XZ44FT and XX67DD for the failure phenomenon of registration date 2002-06-26 and model PC190, CK56EE for the failure phenomenon of registration date 2002-06-27 and model WA610, and XZ44FT for the failure phenomenon of registration date 2002-06-30 and model PC190 are respectively registered. Incidentally, in this example, for the failure phenomenon of registration date 2002-06-20 and model PC190, no trouble code displayed is registered. Furthermore, as the accumulated number of occurrences for each failure phenomenon, for example, 41 and 12 respectively for the aforementioned trouble code XZ44FT and XX67DD with regard to the failure phenomenon of registration date 2002-06-26 and model PC190, and 3 for the failure phenomenon of registration date 2002-06-27 model WA610, and 131 for the failure phenomenon of registration date 2002-06-30 and model PC190 are respectively registered. Incidentally, in this example, for the failure phenomenon of registration date 2002-06-20 and model PC190, no accumulated number of occurrences is registered.

FIG. 7 shows an example of the table in which the failure management information on the working machine 1 is registered and which is held (managed) by (the maintenance server 14 of) the abovementioned management server 10 (hereinafter referred to as "failure management information table"). In the failure management information table shown in FIG. 7, as the kind of trouble, "Level of cooling water is abnormally low" is indicated.

For example, when some sort of trouble occurs in the working machine 1, a serviceman diagnoses the trouble occurred in the working machine 1 at the work site and then he/she operates the input device 144 of the UI device 140 which is mounted on the working machine 1, in order to transmit the information related to the result of the aforementioned trouble diagnosis, that is, the failure occurrence information to the management server 10. On receiving this failure occurrence information, in the management server 10 side, the maintenance server 14 retrieves a treatment example which is suitable for fixing the aforementioned trouble out of the failure management information table shown in FIG. 7, with using "model", "type", "machine number", "trouble code" as the retrieval conditions.

In the failure management information shown in FIG. 7, the item "priority order" is set. The priority order indicates that the higher rank has a higher possibility of appropriateness in troubleshooting (fixing the trouble). The priority order is basically given in the order from the largest number of actual cases (the total number of treatment examples for a failure such as a trouble transmitted from the working machine 1 located in a work site, or the total number of manually-input trouble treatment examples registered in the job server explained in FIG. 6 (not shown)). However, even in the case where the number of actual cases is less than the others, a failure (phenomenon) which inevitably occurs for reasons of design or production of the working machine 1 is registered as "100% occurrence" and given the highest priority order. Among the examples registered as "100% occurrence", for the larger number of actual cases, the higher priority order is given. Furthermore, the extent of advancing the service meter (for a trouble which becomes obvious in accordance with the usage time of the working machine 1), and environmental data such as the altitude of the work site where the working machine 1 is located (for a trouble (failure) phenomenon which depends on the degree of atmospheric pressure) and the outside air temperature (for a trouble phenomenon which depends on the degree of temperature) may be taken into account to give the priority order.

The failure management information table includes items, as shown in FIG. 7, priority order, model, type, target machine number, trouble code, kind of trouble, occurrence probability, number of actual cases, failure item, and treatment method. The respective items of model, type, target machine number, trouble code, kind of trouble, occurrence probability, number of actual cases, failure item, and treatment method are so set that all of them are associated with each priority order, and are correlated with one another.

As the priority order, 1, 2, 3, 4, and soon are registered. As the model, e.g. PC190; as the type, e.g. 11; as the trouble code, 6-digit alphanumeric characters of e.g. XZ44FT; and as the kind of trouble, an event of e.g. "Level of cooling water is abnormally low" are respectively registered for all of the aforementioned priority orders (1, 2, 3, 4 and so on). Next, as the target machine number, 30000 and larger for priority order 1, and 40000 to 40100 for priority order 4 are respectively registered. Incidentally, in this example, both for priority order 2 and 3, no target machine number is registered. Next, as the occurrence probability, for example, 100% occurrence for priority order 1, and small for priority order 4 are respectively registered. Incidentally, in this example, both for priority order 2 and 3, no occurrence probability is registered.

Next, as the number of actual cases, for example, 35 for priority order 1, 131 for priority order 2, 41 for priority order 3, and 2 for priority order 4 are respectively registered. Next, as the failure item, events, for example "Mounting angle of cooling water level switch is inadequate" for priority order 1, "Cooling water is insufficient" for priority order 2, "Connector of cooling water level switch is come off" for priority order 3, and "Retightening of drain valve of cooling water tank is forgotten" for priority order 4 are respectively registered.

Furthermore, as the treatment method, events, for example, "Re-adjust angle" for priority order 1, "Refill cooling water" for priority order 2, "Surely fit connector" for priority order 3, and "After retightening, refill cooling water" for priority order 4 are respectively registered.

FIG. 8 shows an example of the table in which treatment examples displayed in the priority order on the display 142 of the UI device 140 provided in the working machine 1 are registered (priority-ordered treatment example table), that is, the latest failure management information table.

The latest failure management information table shown in FIG. 8 is used as a table of treatment example options from which a serviceman selects a treatment example both on fixing a failure occurred in the working machine 1 and on reporting the contents of treatment to the management server 10 side. The latest failure management information table shown in FIG. 8 is an example of the case where in the model PC190, type 11, machine number 40032 of the working machine 1, the kind of trouble indicated by XZ44FT, that is, "Cooling water level is abnormally low" occurs. On the display 142, as a cause of the failure occurred in the working machine 1, highly probable causes are displayed, and then the serviceman refers to the displayed information to carry out troubleshooting on the working machine 1.

More specifically, as shown in FIG. 8, the serviceman checks the failure occurrence causes in the order from the highest ranked one. As the result of the check, in the case that he/she determines the hit one as the exact cause, he/she operates the input device 144 (numeric keypad) provided in the UI device 140 to transmit the selection No. corresponding to that cause from the UI device 140 to the management server 10 side.

In the case where the cause and the treatment example pertinent to the failure are not registered in the latest failure management information table displayed on the 142, the serviceman operates the input device 144 to input the selection No. 5 (possible cause=others) in the latest failure management information table shown in FIG. 8 to the UI device 140. After coming back from the work site, the serviceman inputs the treatment contents which he/she actually carried out at the work site, so that a new treatment example is registered in the latest failure management information table.

The latest failure management information table includes items, as shown in FIG. 8, selection No., occurrence probability, number of actual cases, possible cause (in order of possibility), and treatment method. The respective items of occurrence probability, number of actual cases, possible cause (in order of possibility), and treatment method are so set that all of them are associated with each selection No. (1 to 5), and are correlated with one another.

As the selection No., 1, 2, 3, 4, 5 and soon are registered. Next, as the occurrence probability, for example, 100% occurrence for selection No. 1 and small for selection No. 4 are respectively registered. Incidentally, in this example, for selection No. 2, selection No. 3, and selection No. 5, no occurrence probability is registered. Next, as the number of actual cases, for example, 35 for selection No. 1, 131 for selection No. 2, 96 for selection No. 3, and 2 for selection No. 4 are respectively registered. Incidentally, in this example, for selection No. 5, the number of actual cases is not registered. Next, as the possible cause (in order of possibility), events, for example "Mounting angle of cooling water level switch is inadequate" for selection No. 1, "Cooling water is insufficient" for selection No. 2, "Connector of cooling water level switch is come off" for selection No. 3, and "Retightening of drain valve of cooling water tank is forgotten" for selection No. 4 are respectively registered. In addition, in this example, for selection No. 5, an event "Others" is registered.

Next, as the treatment method, events, for example, "Readjust angle" for selection No. 1, "Refill cooling water" for selection No. 2, "Surely engage connector" for selection No. 3, and "After re-tightening, refill cooling water" for selection No. 4 are respectively registered. Incidentally, in this example, for selection No. 5, no event as the treatment method is registered.

FIG. 9 shows a processing flow in receiving and transmitting information between the working machine 1 and the management server 10, in the information providing system of the working machine according to an embodiment of the present invention. The processing flow shown in FIG. 9 is a flow applied where a serviceman troubleshoots a failure occurred in the working machine 1 in a work site, by referring the latest failure management information table, which is transmitted from the management server 10 side to the communication controller 110 of the working machine 1 and displayed on the display 142 of the UI device 140.

In FIG. 9, the serviceman operates the input device 144 of the UI device 140, so that various information on the failure (trouble) reported via the electronic controller 100 in the working machine 1 (failure occurrence information) is transmitted to the communication server 12 by the communication controller 110 (Step S201). On receiving the aforementioned failure occurrence information, the communication server 12 notifies the maintenance server 14 that it has received the failure occurrence information from the working machine 1 side (Step S202). Incidentally, in the maintenance server 14, as already mentioned, the design failure information, the production failure information and the information on a treatment example carried out at a work site are preliminarily or occasionally recorded. On receiving the aforementioned notification, the maintenance server 14 additionally records the failure occurrence information transmitted from the working machine 1 in its built-in database.

The maintenance server 14 performs an arithmetic processing, based on the abovementioned design failure information, production failure information and information on a treatment example carried out at a work site, and the aforementioned additionally recorded failure occurrence information, to obtain predetermined statistical information. The statistical information obtained by the maintenance server 14 includes, for example, the occurrence frequency of each trouble (failure), the success probabilities of respective multiple treatment examples carried out for each trouble (failure) at the work sites, a correlation between the occurrence frequency of each trouble (failure) and time when the working machine was manufactured, and a correlation between the occurrence frequency of each trouble (failure) and the accumulated operation time. In addition to the above, the statistical information also includes a correlation between the occurrence frequency of each trouble (failure) and a region where the working machine operates, a correlation between the occurrence frequency of each trouble (failure) and the altitude and outside air temperature of the work site where the working machine is located, and a correlation between the occurrence frequency of each trouble (failure) and the hours of use of the working machine.

After obtaining the abovementioned statistical information by the arithmetic processing, the maintenance server 14 transmits the statistical information to the communication server 12 (Step S203). On receiving the aforementioned statistical information, the communication server 12 transmits the aforementioned statistical information to the working machine 1 side (Step S204). As the working machine 1 side receives the aforementioned statistical information, the communication controller 110 correlates the aforementioned statistical information with the abovementioned failure occurrence information to record it on the built-in storage device 111. The aforementioned statistical information is displayed from the storage device 111 on the display 142, by that a serviceman operates the input device 144 of the UI device 140. In order to fix the working machine 1, the serviceman who arrives at the work site refers to the screen of the aforementioned statistical information displayed on the display 142 of the UI device 140, so that he/she carries out the fixing operation in the order from an inspection point where the most effective treatment can be expected (Step S205).

Then, the serviceman selects the contents of the treatment which he/she found effective in the aforementioned fixing operation from the treatment examples of the screen contents displayed on the display 142. In the case where the treatment carried out by the serviceman is a new example that is not included in the aforementioned treatment examples, the serviceman operates the input device 144 to input the new treatment example to the UI device 140. Thus, the input new example is transmitted from the UI device 140 via the communication controller 110 to the management server 10 side (Step S206). It should be noted that the transmission of the new example to the management server 10 side may be so performed that the serviceman uses the portable terminal carried by himself/herself to input the data via Web connections, or can be so performed that after coming back to the office the serviceman operates the maintenance server 14 to input the data directly to the maintenance server 14.

Incidentally, the information related to the new example which is transmitted from the communication controller 110 to the management server 10 side is received, as an example of treatment carried out at the work site for the failure occurrence information, by the communication server 12, from which the information is further transferred to the maintenance server 14 (Step S207). The maintenance server 14, when the information on the treatment examples increases and accumulates more than a certain amount in the built-in memory thereof, restarts the arithmetic processing operation for obtaining the abovementioned statistic information (Step S208).

Figure 10:
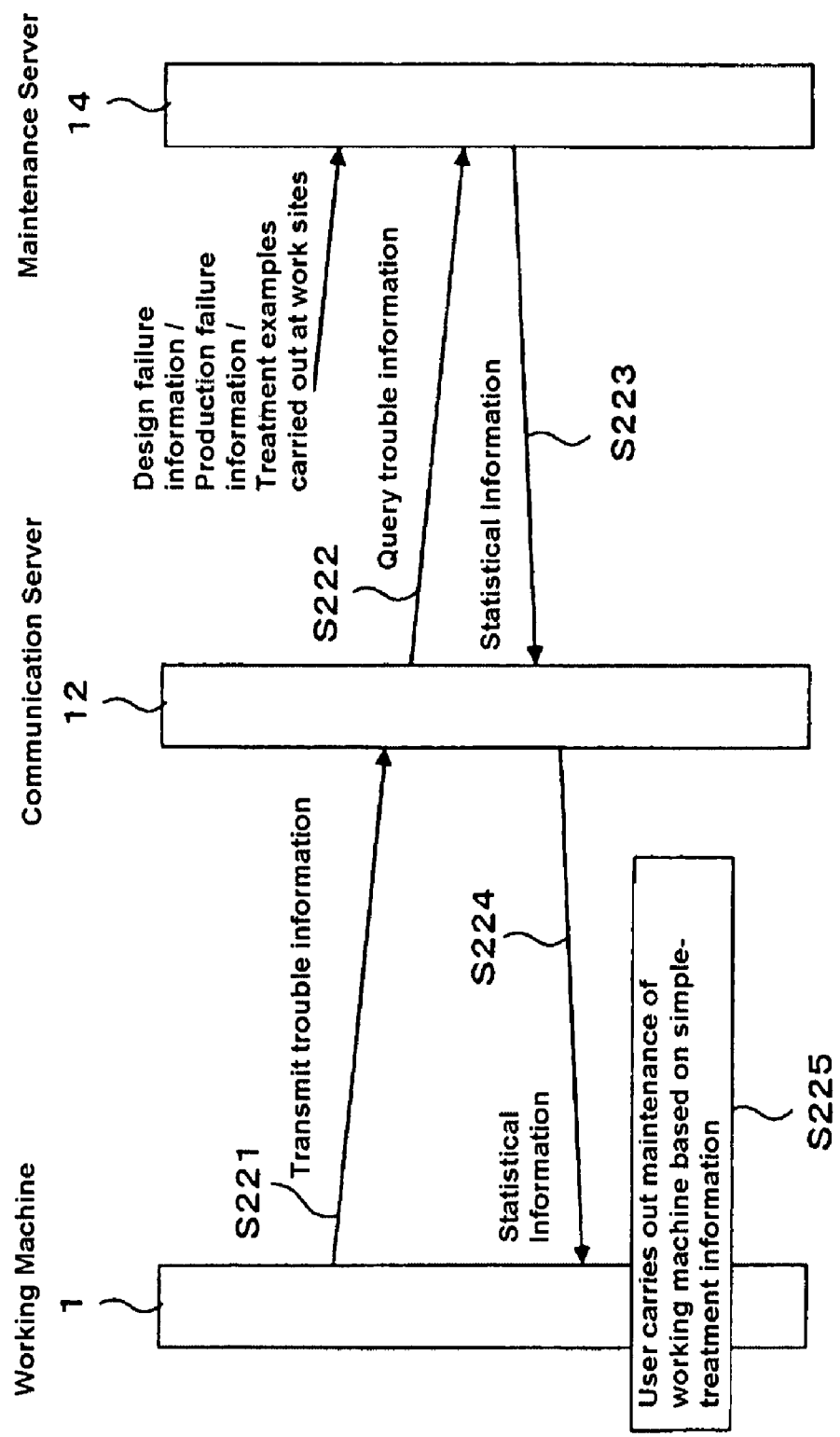
FIG. 10 shows another example of the processing flow in receiving and transmitting information between the working machine and the management server, in the information providing system of the working machine according to an embodiment of the present invention.

FIG. 10 shows another example of the processing flow in receiving and transmitting information between the working machine 1 and the management server 10, in the information providing system of the working machine according to an embodiment of the present invention. The processing flow shown in FIG. 10 is a flow applied where a serviceman troubleshoots a failure occurred in the working machine 1 in a work site, by referring the latest failure management information table, which is transmitted from the management server 10 side to the communication controller 110 of the working machine 1 to be displayed on the display 142 of the UI device 140. In other words, in FIG. 10, the processing operation shown in Step S221 corresponds to the processing operation shown in Step S201 in FIG. 9, and the processing operation shown in Step S222 corresponds to the processing operation shown in Step S202 in FIG. 9, respectively. Also, the processing operation shown in Step S223 corresponds to the processing operation shown in Step S203 in FIG. 9, and the processing operation shown in S224 corresponds to Step S204 in FIG. 9, respectively. Therefore, the detailed explanation of the processing operations shown in Step S221-Step S224 is omitted.

Next, in the working machine 1 side, the statistical information received via the communication server 12 from the maintenance server 14 is recorded on the storage device 111 of the communication controller 110, with being correlated with the previously-mentioned failure occurrence information. Besides, the aforementioned failure occurrence information and, for example, the latest failure management information table shown in FIG. 8 (This table includes, of such treatment examples as previously mentioned, an item for which even a user can easily carry out the inspection and treatment; for example, an item that the cooling water quantity is checked and is found not enough, then refilled, an item that dirt of the filter is checked and is found severe, then the filter is replaced with a new filter, and so on) are displayed on the display 142 of the UI device 140.

A user or a serviceman carries out maintenance based on the contents of the aforementioned latest failure management information table displayed on the display 142 (Step S225).

Figure 11:
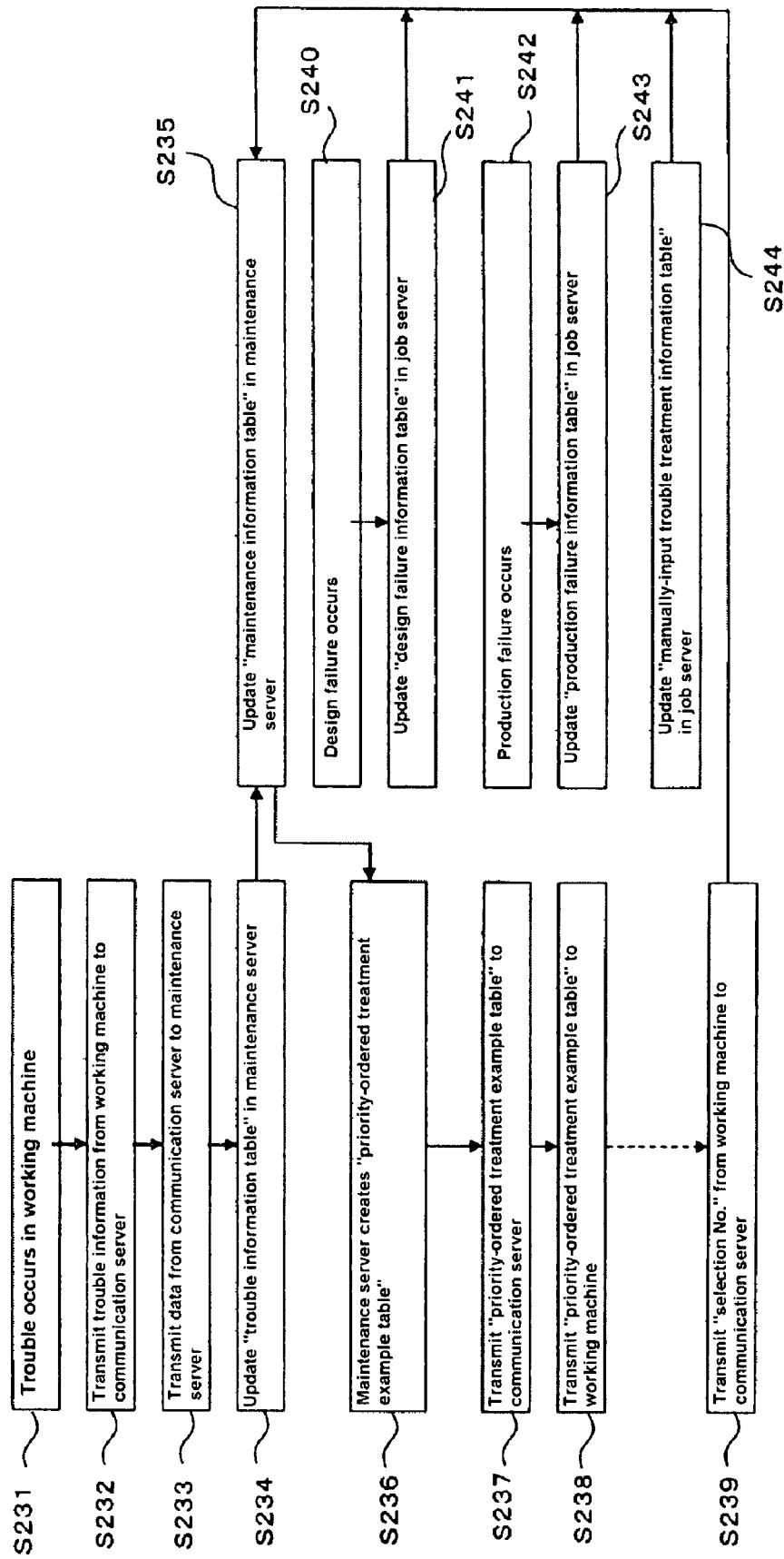
FIG. 11 is a flow chart showing the entire processing operation of respective parts of which the information providing system of the working machine according to an embodiment of the present invention consists.

FIG. 11 is a flow chart showing the processing operations of respective parts of which the information providing system of the working machine according to an embodiment of the present invention consists.

In FIG. 11, when any trouble (failure) occurs in the working machine 1 working at a work site (Step S231), trouble information, that is, the failure occurrence information is transmitted from the working machine 1 side to the communication server 12 side (Step S232). Upon receiving the aforementioned failure occurrence information, the communication server 12 transfers the aforementioned failure occurrence information to the maintenance server 14 (Step S233). On receiving the aforementioned failure occurrence information, the maintenance server 14, based on the aforementioned failure occurrence information, updates the contents recorded on the built-in failure management table (see FIG. 7) (Step S235). Next, on receiving a report on the treatment example for the occurred failure from the working machine 1 via the communication server 12, the maintenance server 14, based on the report, creates the latest failure management information table shown in FIG. 8 (Step S236). Then, the maintenance server 14 transmits the latest failure management information table just created to the working machine 1 via the communication server 12 (Step S237, S238).

Next, when the serviceman operates the input device (numeric keypad) 144 provided in the UI device 140 to input a selection No. which corresponds to the cause matching with the failure occurrence cause, the information related to the selection No. is transmitted from the working machine 1 via the communication server 12 to the maintenance server 14

(Step S239, S235). On receiving the aforementioned information related to the selection No., the maintenance server 14, based on it, updates the contents recorded on the failure management information table shown in FIG. 7 (Step S235).

Next, when any design failure occurs during the development and production process of the working machine 1 (Step S240), the job server (not shown), which is served as a server arranged for managing the development and production process of the working machine 1, updates the design failure information table (see FIG. 4) which is under the management of the job server (not shown) (Step S241). As the processing operation of Step S241 is completed, the step proceeds to Step S235.

Next, when any production failure occurs during the development and production process of the working machine 1 (Step S242), the abovementioned job server (not shown) updates the production failure information table (see FIG. 5) which is under the management of the job server (not shown) (Step S243). As the processing operation of Step S243 is completed, the step proceeds to Step S235.

Incidentally, in the case where the manually-input trouble treatment information table (see FIG. 6) is updated in the abovementioned job server (not shown) (Step S244), the step proceeds to Step S235.

While the present invention has been described with regard to the preferred embodiments and the variations thereof, they are intended to be illustrative, not limiting the scope of the invention within these embodiments and the variations thereof. Various other embodiments can be possible in the present invention.

The invention claimed is:

1. A centralized information management device of a working machine comprising:

working machines in addition to the working machine, thereby making up a plurality of working machines;

a storing means for separately storing failure management information including at least information that indicates a method of handling a failure which is expected to occur, depending on each individual working machine which is under the management of the device; the storing means further for storing treatment information for each model of various models of the plurality of working machines which are under the management of the device;

an information processing means for receiving information related to each individual working machine, which includes at least predetermined failure information that indicates failure occurrence, wirelessly transmitted from information transmitting/receiving means arranged in each individual working machine under the management of the device, to perform a predetermined processing on the information; the information processing means further for receiving information, which also includes failure-handling result information that indicates failure handling performed on an occurred failure for each model of the working machine, classifying the received failure information for each model, processing the received failure information statistically, determining a failure which is expected to occur for each model, associating the received failure information and the expected failure determination, and determining a method of handling the failure with respect to each failure;

a failure management information revising means for performing an update processing or an additional processing of new information on the failure management information stored in the storing means, based on a processing result by the information processing means; the failure management information revising means further for performing an update processing of the treatment information for each model on the failure management information stored in the storing means; and a transmitting means for transmitting the failure management information or the revised failure management information in response to a request from the information transmitting/receiving means arranged in each individual working machine or from a portable terminal carried by an operator; the transmitting means further for transmitting the treatment information corresponding to the model of each individual working machine in the updated failure management information in response to the request from the information transmitting/receiving means arranged in each of the individual working machines or from the portable terminal carried by the operator.

2. A failure management information providing system of a working machine comprising a working machine and a centralized information management device which puts the working machine under its management, wherein the working machine has:

a condition detecting means for detecting conditions of respective parts of which the working machine consists;

a failure information generating means for collecting information related to the conditions of the respective parts which is detected by the condition detecting means to check whether or not a failure occurs in the respective parts referring to the collected information, and when the failure occurrence is distinguished, generating predetermined failure information to output it;

an information transmitting/receiving means for wirelessly transmitting the failure information output from the failure information generating means as well as receiving treatment information related to the failure information wirelessly transmitted to output it; and an informing means for serving to inform an operator of the failure information output from the failure information generating means or the treatment information output from the information transmitting/receiving means, and wherein the centralized information management device has:

a storing means for separately storing failure management information including at least information that indicates a method of handling a failure which is expected to occur, depending on each individual working machine which is under the management of the device;

an information processing means for receiving information related to each individual working machine, which includes at least the predetermined failure information that indicates the failure occurrence, wirelessly transmitted from the information transmitting/receiving means arranged in each individual working under the management of the device, to perform a predetermined processing on the information;

a failure management information revising means for performing an update processing or an additional processing of new information on the failure management information stored in the storing means based on a processing result by the information processing means; and a transmitting means for transmitting the failure management information or the revised failure management information in response to a request from the information transmitting/receiving means arranged in each individual working machine or from a portable terminal carried by an operator, wherein the failure management information management providing system further comprises working machines including the working machine, wherein at least one of the working machines has:

the condition detecting means further for detecting conditions of respective parts of which the working machine consists;

the failure information generating means further for collecting information related to the conditions of the respective parts which are detected by the condition detecting means to check whether or not the failure occurs in the respective parts referring to the collected information, when the failure occurrence is distinguished, generating failure information, that indicates the occurred failure; and when a method of handling is performed for the occurred failure, inputting handling method information that indicates the performed method of handling;

the information transmitting/receiving means further for wirelessly transmitting, to the centralized information management device, failure information generated in the failure information generating means and handling method information input to the failure information generating means as well as receiving treatment information that indicates the method of handling for a failure which is expected to occur, wirelessly received from the centralized information management device, to output it; and the informing means further for serving to inform an operator of the treatment information output from the transmitting/receiving means; and the centralized information management device has:

the storing means further for storing the failure management information including at least treatment information that indicates a method of handling a failure which is expected to occur, for each model of various models of the working machines which are under the management of the device;

the information processing means further for receiving the information related to each individual working machine, which includes the predetermined failure information that indicates failure occurrence plus failure handling result information that indicates failure handling performed on the occurred failure for each model of the working machine, classifying the received failure information for each model, processing the received information statistically, determining a failure which the received failure information expected to occur for each model, associating the received failure information and the expected failure determination, and determining a method of handling the failure with respect to each failure;

the failure management information revising means further for performing an update processing of the treatment information for each model based on the failure management information stored in the storing means; and the transmitting means further for transmitting the treatment information corresponding to the model of each individual working machine in the updated failure management information in response to the request from the information transmitting/receiving means arranged in each of the individual working machines or from the portable terminal carried by the operator, to each of the individual working machines or the portable terminal.

3. A failure management information providing method of a working machine comprising a working machine; working machines in addition to the working machine, thereby making up a plurality of working machines; and a centralized information management device which puts the working machine under its management, comprising the steps of:

detecting conditions of respective parts of which the working machine consists;

collecting information related to the conditions of the respective parts which is detected by the step of detecting the conditions to check whether or not a failure occurs in the respective parts referring to the collected information, and when the failure occurrence is distinguished, generating predetermined failure information to output it;

wirelessly transmitting the failure information generated in the step of generating and outputting the failure information as well as receiving treatment information related to the failure information wirelessly transmitted to output it; and informing an operator of the failure information generated in the step of generating and outputting the failure information or the treatment information received in the step of receiving and outputting the treatment information, and wherein the centralized information management device includes the steps of:

separately storing failure management information including at least information that indicates a method of handling a failure which is expected to occur, depending on each individual working machine which is under the management of the device; the storing of the failure management information includes storing treatment information for each model of various models of the plurality of working machines which are under the management of the device;

receiving information related to each individual working machine, which includes at least the predetermined failure information that indicates the failure occurrence, wirelessly transmitted from an information transmitting/receiving means arranged in each individual working machine under the management of the device, to perform a predetermined processing on the information; the receiving information includes failure-handling result information that indicates failure handling performed on an occurred failure for each model of the working machine, classifying the received failure information for each model, processing the received failure information statistically, determining a failure which is expected to occur for each model, associating the received failure information and the expected failure determination, and determining a method of handling the failure with respect to each failure;

performing an update processing or an additional processing of new information on the failure management information stored in the step of storing, based on a processing result in the step of performing the predetermined processing; the performing of the update processing including update processing of the treatment information for each model based on the failure management information stored in the storing means; and transmitting the failure management information or the revised failure management information in response to a request from the information transmitting/receiving means arranged in each individual working machine or from a portable terminal carried by an operator, the transmitting including transmitting the treatment information corresponding to the model of each individual working machine in the updated failure management information in response to the request from the information transmitting/receiving means arranged in each of the individual working machines or from the portable terminal carried by the operator.

4. A centralized information management method of a working machine comprising the steps of:

separately storing failure management information including at least information that indicates a method of handling a failure which is expected to occur, depending on each individual working machine which is under the management;

receiving information related to each individual working machine, which includes at least predetermined failure information that indicates failure occurrence, wirelessly transmitted from information transmitting/receiving means arranged in each individual working machine under the management, to perform a predetermined processing on the information;

performing an update processing or an additional processing of new information on the failure management information stored in the step of storing, based on a processing result in the step of performing the predetermined processing;

transmitting the failure management information or the revised failure management information in response to a request from the information transmitting/receiving means arranged in each individual working machine or from a portable terminal carried by an operator; and the centralized information management method managing working machines including the working machine, wherein the previously the steps of separately storing failure management information, receiving information related to each individual working machine, performing an update processing or an additional processing of new information, and transmitting the failure management information or the revised failure management information in response are performed for at least one of the working machines and further comprise:

when the failure information indicates the failure occurred, a method of handling is performed for the occurred failure by inputting handling method information that indicates the performed method of handling;

receiving the information related to each individual working machine plus failure-handling result information that indicates failure handling performed on the occurred failure for each model of the working machine as well as receiving treatment information that indicates the method of handling for a failure which is expected to occur, classifying the received failure information for each model, processing the received information statistically, determining a failure which the received failure information expected to occur for each model, associating the received failure information and the expected failure determination, and determining a method of handling the failure with respect to each failure;

performing the update processing of the treatment information for each model on the failure management information stored in the storing means; and transmitting the treatment information corresponding to the model of each individual working machine in the updated failure management information in response to the request from the information transmitting/receiving means arranged in each of the individual working machine or from the portable terminal carried by the operator, to each of the individual working machines or the portable terminal.

* * * * *